April 13, 1926.
C. E. ABERSON
REEL
Filed Jan. 28, 1925
1,580,986
2 Sheets-Sheet 1
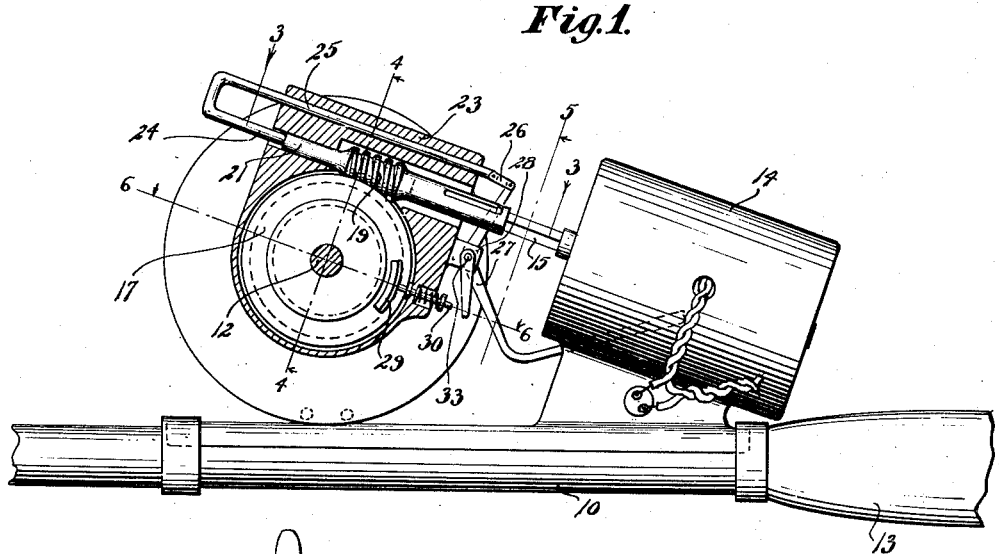
Fig.1.
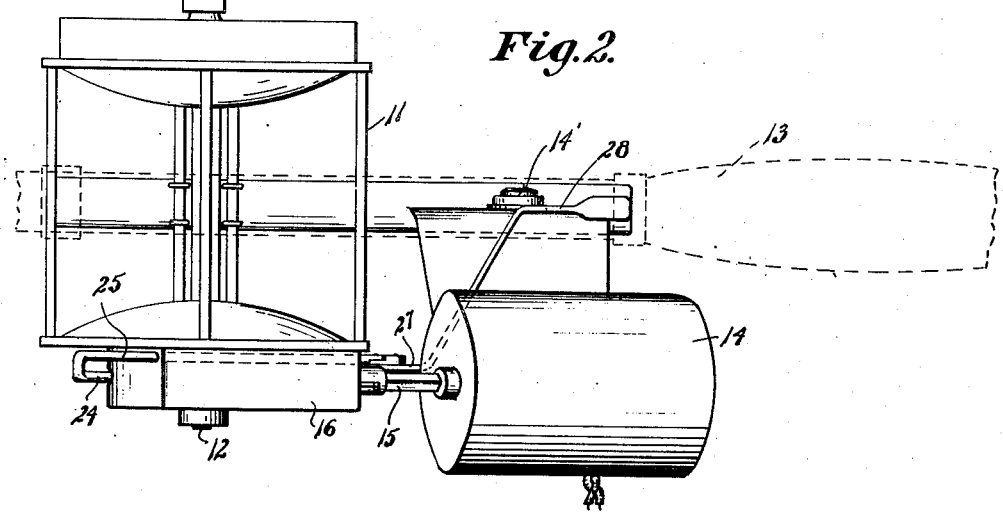
Fig.2.
Fig.7.
C. E. Aberson,
INVENTOR
WITNESS:
ATTORNEY April 13, 1926.
C. E. ABERSON
REEL
Filed Jan. 28, 1925
1,580,986
2 Sheets-Sheet 2
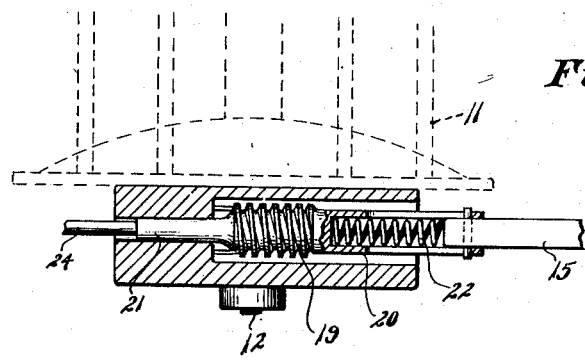
Fig. 3.
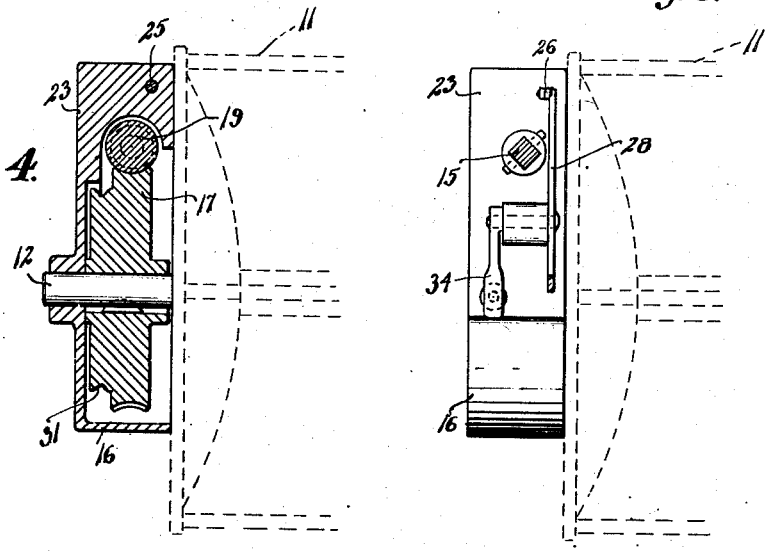
Fig. 4.
Fig. 5.
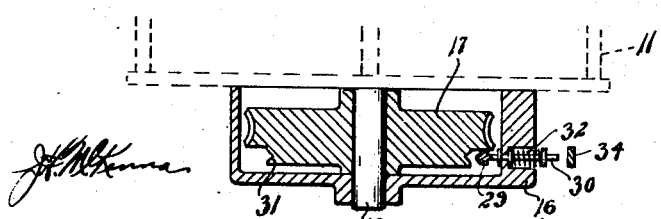
Fig. 6.
C. E. Aberson,
INVENTOR Patented Apr. 13, 1926.

1,580,986

UNITED STATES PATENT OFFICE.

CHARLES E. ABERSON, OF LOUGHMAN, FLORIDA.

REEL.

Application filed January 28, 1925. Serial No. 5,349.

*To all whom it may concern:*

Be it known that I, CHARLES E. ABERSON, a citizen of the United States, residing at Loughman, in the county of Polk and State of Florida, have invented new and useful Improvements in Reels, of which the following is a specification.

This invention relates to fishing reels, and has for its primary object the provision of means whereby the reel can be actuated by a motor and conveniently controlled to allow the user to play his catch or to apply power to the reel in order to wind the line thereabout as the occasion may require.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a view in elevation partly in section showing the connection between the motor and the reel.

Figure 2 is a top plan view.

Figure 3 is a sectional view taken on line 3—3 of Figure 1.

Figure 4 is a sectional view taken on line 4—4 of Figure 1.

Figure 5 is a sectional view taken on line 5—5 of Figure 1.

Figure 6 is a sectional view taken on line 6—6 of Figure 1.

Figure 7 is a sectional view of the switch.

Referring to the drawings in detail, 10 indicates generally a fishing rod, upon which is mounted in the ordinary manner a fishing reel 11, and the shaft of which is indicated at 12. Mounted upon the rod 10 adjacent the handle 13 is an electric motor 14 which may receive its current from any suitable source, preferably from storage batteries "not shown" which can be supported on the body of the user in any suitable manner. The shaft for the motor is indicated at 15, and this shaft is suitably geared to the shaft 12 to rotate the latter. The motor is of course provided with a switch, so that it can be readily started and stopped when desired, and while the switch can be of any suitable type, it is preferably in the nature of a push button switch indicated generally at 14' in Figures 2 and 7. As shown in Figure 2, the reel is provided with a gear casing 16 which is arranged at one end thereof, and in this casing is a gear 17 which is adapted to mesh with a gear 19 slidably associated with the shaft 15 of the motor. As shown in Figure 3, the gear 19 is formed with hollow extensions 20 and 21 respectively which project from the opposite ends of the gear 19, the hollow extension 20 being slidably fitted upon the adjacent end of the motor shaft 15 so that it can be shifted to an inactive position, or in other words separated from the gear 17 when it is desired to stop the reel from rotating. As shown in Figure 3, a coiled spring 22 is arranged within the extension 20 and bears against the adjacent end of the motor shaft 15 to hold the gear 19 normally in mesh with the gear 17.

A substantially U-shaped shifting rod is utilized to slide the gear 19 away from the gear 17, and this rod is slidably mounted in a suitable casting 23 as shown in Figure 1. The spaced parallel limbs of the rod are relatively different lengths, the limb 24 being received by the adjacent extension 21 of the gear 19, while the longer limb 25 slides through the casing 23 above and parallel with the gear 19. The free end of this limb 25 is connected by a link 26 with the adjacent end of an angular shaped lever 27, and which lever is fulcrumed at an appropriate point between its ends on a suitable lug 28 projecting from one end of the casing 23. This lever 27 is formed with a hand engaging portion 28' which is offset to lie immediately adjacent the handle 13 of the fishing rod, so that the lever 27 can be conveniently rocked upon its fulcrum as the occasion may require. It is important from the structure herein shown and described, that the gear 19 is normally in mesh with the gear 17 of the reel, and that when the motor is called into use, the reel is driven by the motor and will continue to rotate until either the motor is cut out, or the gear 19 is separated from the gear 17. For this purpose, it is only necessary to depress the lever 27, which draws the shifting rod through its casting 23 and incidently moves the gear 19 out of mesh from the gear 17. As long as the lever 17 is maintained in its depressed position, the motor may continue to operate without transmitting any motion to the reel, and by releasing the lever can be put into motion. Consequently, the reel can be very conveniently manipulated to allow the sportsman or user to play his catch and to apply power to the reel when it is desired to wind the line thereabout.

To immediately check the rotation of the reel when the gear 19 is separated from the gear 17, I make use of a brake 29 which is supported on one end of the spring pressed rod 30 mounted for sliding movement through the opening in the gear casing 16. The brake operates within the casing as shown in Figures 1 and 6, but is normally held spaced from the braking disk 31 through the instrumentality of the spring 32. Carried by one end of the pivot 33 for the lever 27 is an arm 34, and this arm is arranged immediately adjacent the end of the rod 30. The arm 34 moves with the pivot 33 when the lever 27 is depressed, and consequently, the arm is utilized to apply the brake 29 simultaneously with the separation of the gear 19 from the gear 17.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. In combination, a fishing rod, a reel mounted thereon for rotation, a motor supported on said rod for rotating the reel, means including a manually operable lever for disconnecting the reel from the motor, a brake for checking the rotation of said reel when the latter is separated from the motor, and means operated by said lever for applying the brake at the same time the reel is separated from the motor.

2. In combination, a fishing rod, a reel supported for rotation thereon, a motor mounted on the rod, a gear carried by the reel, a sliding gear actuated by said motor and normally meshing with the gear on said reel, means including a lever for separating the sliding gear from the reel, and means also operated by the same lever for checking the rotation of the reel when separated from the motor.

3. In combination, a fishing rod, a reel supported thereon for rotation, a gear fixed to the shaft of the reel, a motor supported on the rod and including a shaft, a gear supported on said motor shaft for sliding movement, and normally meshing with the gear of said reel, yieldable means for normally holding said gears in mesh, whereby the reel is rotated from said motor, means including a lever for separating the sliding gear from said reel, and means simultaneously operated by the same lever for checking the rotation of the reel when said gears are separated.

4. In combination, a fishing rod, a reel mounted for rotation thereon, a motor supported on the rod, a gear on said reel, a sliding gear forming part of said motor and normally meshing with the first mentioned gear, whereby the reel is rotated by said motor, means including a manually operable lever for separating said gears to disconnect the reel from the motor, a brake including a disk associated with the reel, a brake shoe normally spaced from the disk, and means carried by said lever for moving the brake shoe into engagement with the disk when the lever is operated to separate the reel from the motor.

5. In combination, a fishing rod, a reel mounted thereon for rotation, a motor supported on said rod and including a shaft, a casting adjacent said reel and having spaced parallel bores, a gear carried by the reel, a sliding gear operating in one of the bores of said casting and normally meshing with the gear of said reel, a substantially U-shaped member slidably mounted in said casting and also slidably associated with the motor operated gear, yieldable means for normally holding the last mentioned gear in mesh with the gear of the reel, a lever pivoted between its ends on said casting and connected with the U-shaped member to move the motor gear away from the reel gear upon movement of the lever in one direction, and means operated by the same lever for checking the rotation of the gear of the reel when the latter is separated from the motor.

In testimony whereof I affix my signature.

CHARLES E. ABERSON.